(12) United States Patent
Kubo et al.

(10) Patent No.: US 8,794,606 B2
(45) Date of Patent: Aug. 5, 2014

(54) LIQUID SEALED VIBRATION ISOLATING DEVICE

(75) Inventors: Nobuo Kubo, Wako (JP); Hiroshi Yanagase, Wako (JP); Jun Saito, Fujimino (JP); Masatomo Nishizaka, Fujimino (JP)

(73) Assignee: Honda Motor Co., Ltd., Tokyo (JP)

( * ) Notice: Subject to any disclaimer, the term of this patent is extended or adjusted under 35 U.S.C. 154(b) by 178 days.

(21) Appl. No.: 12/673,689

(22) PCT Filed: Aug. 26, 2008

(86) PCT No.: PCT/JP2008/065200
§ 371 (c)(1),
(2), (4) Date: Feb. 16, 2010

(87) PCT Pub. No.: WO2009/028501
PCT Pub. Date: Mar. 5, 2009

(65) Prior Publication Data
US 2011/0101581 A1 May 5, 2011

(30) Foreign Application Priority Data
Aug. 27, 2007 (JP) ................................. 2007-220402

(51) Int. Cl.
*F16F 5/00* (2006.01)
(52) U.S. Cl.
USPC .................................................... 267/140.13
(58) Field of Classification Search
USPC ................ 267/140.13, 140.14, 140.11–141.7
See application file for complete search history.

(56) References Cited

U.S. PATENT DOCUMENTS

| 4,986,510 A * | 1/1991 | Bellamy et al. ........... 267/140.13 |
| 6,505,822 B1 * | 1/2003 | Yamamoto et al. ...... 267/140.13 |
| 6,619,636 B2 * | 9/2003 | Yamamoto et al. ...... 267/140.13 |

FOREIGN PATENT DOCUMENTS

| JP | 62-8448 | 1/1987 |
| JP | 9-014335 | 1/1997 |
| JP | 10-281214 | 10/1998 |
| JP | 2004-251431 | 9/2004 |
| JP | 2004-251438 | 9/2004 |
| JP | 2005-273684 | 10/2005 |
| JP | 2005-273906 | 10/2005 |
| JP | 2006-132615 | 5/2006 |
| JP | 2007-127250 | 5/2007 |

* cited by examiner

*Primary Examiner* — Bradley King
*Assistant Examiner* — Vishal Sahni
(74) *Attorney, Agent, or Firm* — Rankin, Hill & Clark LLP (57) ABSTRACT

A liquid sealed vibration isolating device has an elastically movable diaphragm capable of preventing elastic deformation of a relief valve to realize high damping while preventing a cavitation phenomenon. The relief valve is provided in the elastic movable diaphragm arranged in a partition member in order to open and close a leak passage so as to prevent occurrence of the cavitation phenomenon. The relief valve is integrally formed with a fixing portion of the elastic movable diaphragm. There is provided an upwardly open concavity that the relief valve faces. The relief valve is made thicker and provided with an opening and closing adjustment groove at a basal portion of its inclined wall. The opening and closing adjustment groove is formed with a locally thin bending portion functioning as a starting point of bending in an opening and closing operation of the relief valve.

10 Claims, 11 Drawing Sheets

LIQUID SEALED VIBRATION ISOLATING DEVICE

BACKGROUND OF THE INVENTION

1. Field of the Invention

The present invention relates to a liquid sealed vibration isolating device for use in an engine mount or the like for a motor vehicle, and more particularly, to the device capable of effectively decreasing noises produced by a cavitation phenomenon and of realizing high damping.

2. Description of the Related Art

In this kind of liquid sealed vibration isolating device, there is a possibility that negative pressure is developed in a primary liquid chamber when a heavy load is inputted. Then, the cavitation phenomenon that a portion of a hydraulic liquid is evaporated is created thereby producing noises together therewith. Therefore, various means capable of preventing the noises are proposed. As one of these means, an elastic movable diaphragm is arranged in a through hole provided in a partition member in such a manner that an outer peripheral portion of the diaphragm is able to be contacted with and separated from an inner wall of the through hole. When the high amplitude of vibration is inputted, the outer peripheral portion of the elastic movable diaphragm is deformed and projects into a secondary liquid chamber so as to form a gap for having a large amount of the hydraulic liquid leaked out therethrough (see a patent reference 1).

Patent reference 1: Japanese patent laid open publication No. 2006-132615.

By the way, in the construction using the elastic movable diaphragm, since the elastic movable diaphragm is elastically deformed even when the minute amplitude of vibration is inputted, a seal of the outer peripheral portion becomes imperfect and there is a possibility of causing a leak even at the time of pressurization, so that such leak gives rise to deterioration in damping performance. Therefore, the applicant has proposed the art that a relief valve is provided on the outer peripheral side with respect to a fixed portion having nothing to do with hydraulic pressure absorption of the elastic movable diaphragm. Incidentally, when this relief valve is formed by an elastically deformable film, there is a possibility that the relief valve, at the time of no leaking, is elastically deformed and absorbs the hydraulic pressure by hydraulic pressure fluctuation of the primary liquid chamber, depending on setting of its elastic force or the like.

However, for example, in the case where there is provided a damping orifice which liquid column resonates by the vibration of about 10 Hz so as to obtain high damping, it is thought there are cases that a function of the damping orifice is weakened by the hydraulic pressure absorption of the relief valve so that the predetermined high damping can not be accomplished. On the other hand, when the relief valve is hardened up to the level that is not elastically deformed, the function, as the relief valve, of preventing the cavitation phenomenon is hindered.

Therefore, the present invention aims to provide a liquid sealed vibration isolating device capable of obtaining the high damping while maintaining its original function of preventing the cavitation phenomenon through the relief valve.

SUMMARY OF THE INVENTION

To solve the above mentioned problem, a liquid sealed vibration isolating device according to a first aspect of the present invention comprises a first mounting member being mounted on one of a pair of mounting counterparts, a second mounting member being mounted on the other of the mounting counterparts, an insulator elastically connecting the first and second mounting members, a liquid chamber using the insulator as a part of the wall thereof and being filled with a hydraulic liquid, a secondary liquid chamber being in communication through a partition member with the primary liquid chamber by an orifice passage and having at least a portion of a wall thereof formed by a diaphragm, the partition member comprising a circular elastic movable diaphragm for absorbing internal pressure fluctuation of the primary liquid chamber and a frame member for supporting an outer peripheral portion of the elastic movable diaphragm, a leak passage which communicates between the primary liquid chamber and the secondary liquid chamber, being provided on an outer peripheral side of an elastic movable diaphragm supporting portion of the frame member, and a relief valve which opens and closes the leak passage, being integrally provided in the outer peripheral portion of the elastic movable diaphragm, wherein a thin portion functioning as a starting point of bending in an opening and closing operation is provided on the relief valve so as to form a thin bending portion, and the thickness of the relief valve other than the thin bending portion is greater than the thin bending portion.

In accordance with a second aspect of the present invention, the thin bending portion comprises an opening and closing adjustment groove.

In accordance with a third aspect of the present invention, the relief valve other than the thin bending portion is at least 1.5 times as thick as the thin bending portion.

In accordance with a fourth aspect of the present invention, the opening and closing adjustment groove is provided in a basal portion of the relief valve so as to extend in a circumferential direction.

In accordance with a fifth aspect of the present invention, the opening and closing adjustment groove is formed in the shape of a radially extending groove in the outer peripheral portion of the relief valve.

According to a sixth aspect of the present invention, in the case of where a hydraulic pressure is applied to the primary liquid chamber in a substantially vertical direction, the outer peripheral portion of the relief valve protrudes substantially horizontally in a radial direction, and a stopper portion for supporting the protruding portion on a substantially horizontal plane on the side of the secondary liquid chamber is provided in the partition member.

According to the invention as defined in the first aspect, since the relief valve other than the thin bending portion is not necessary to be formed in a bendable fashion by providing the thin bending portion, the relief valve other than the thin bending portion is formed greater in thickness than the thin bending portion to provide high rigidity, whereby the hydraulic pressure fluctuation of the primary liquid chamber becomes hard to be absorbed, so as to make the high damping by the damping orifice possible. Therefore, it is possible to achieve the assured prevention of the cavitation phenomenon and the realization of the high damping.

According to the invention as defined in the second aspect, since the opening and closing adjustment groove functioning as the starting point of bending in the opening and closing operation is provided in the relief valve and the portion becoming thinner by provision of the opening and closing adjustment groove is used as the thin bending portion, the thin bending portion, when opening and closing the relief valve, can be easily bent at the opening and closing adjustment groove as the starting point of bending whereby the opening and closing operation of the relief valve can be carried out promptly, so that the cavitation phenomenon can be prevented assuredly.

According to the invention as defined in the third aspect, since the relief valve other than the thin bending portion is at least 1.5 times greater in thickness than the thin bending portion, the relief valve other than the thin bending portion can be formed thick enough to provide high rigidity, whereby it becomes easy to have the proper balance between the rigidity and the easiness of bending.

According to the invention as defined in the fourth aspect, since the opening and closing adjustment groove is provided in the basal portion of the relief valve to extend in the circumferential direction, the relief valve can be bent along the circumferentially extending opening and closing adjustment groove thereby making it easy to open and close the relief valve in the case where it extends long in the circumferential direction.

According to the invention as defined in the fifth aspect, since the opening and closing adjustment groove is formed in the shape of a radially extending groove in the outer peripheral portion of the relief valve, both sides in the circumferential direction of the relief valve are bent by using this opening and closing adjustment groove as the start point of bending in such a manner as to push most radially inwardly the portion of the opening and closing adjustment groove located in an intermediate position, an opening area at the time of opening the valve can be increased.

According to the invention as defined in the sixth aspect, in the case where the hydraulic pressure applying direction of the primary liquid chamber is substantially in the vertical direction, the outer peripheral portion of the relief valve protrudes substantially horizontally in the radial direction, and the stopper portion for supporting the protruding portion on the substantially horizontal plane on the side of the secondary liquid chamber is provided in the partition member. Therefore, the protruding portion and the stopper portion can receive or catch the hydraulic pressure of the primary liquid chamber in the vertical direction, so that the valve closing operation can be assuredly carried out.

BRIEF DESCRIPTION OF THE DRAWINGS

FIGS. 8-A and 8-B are views for explaining the operation of a relief valve;

DETAILED DESCRIPTION OF THE PREFERRED EMBODIMENT

Figure 1:
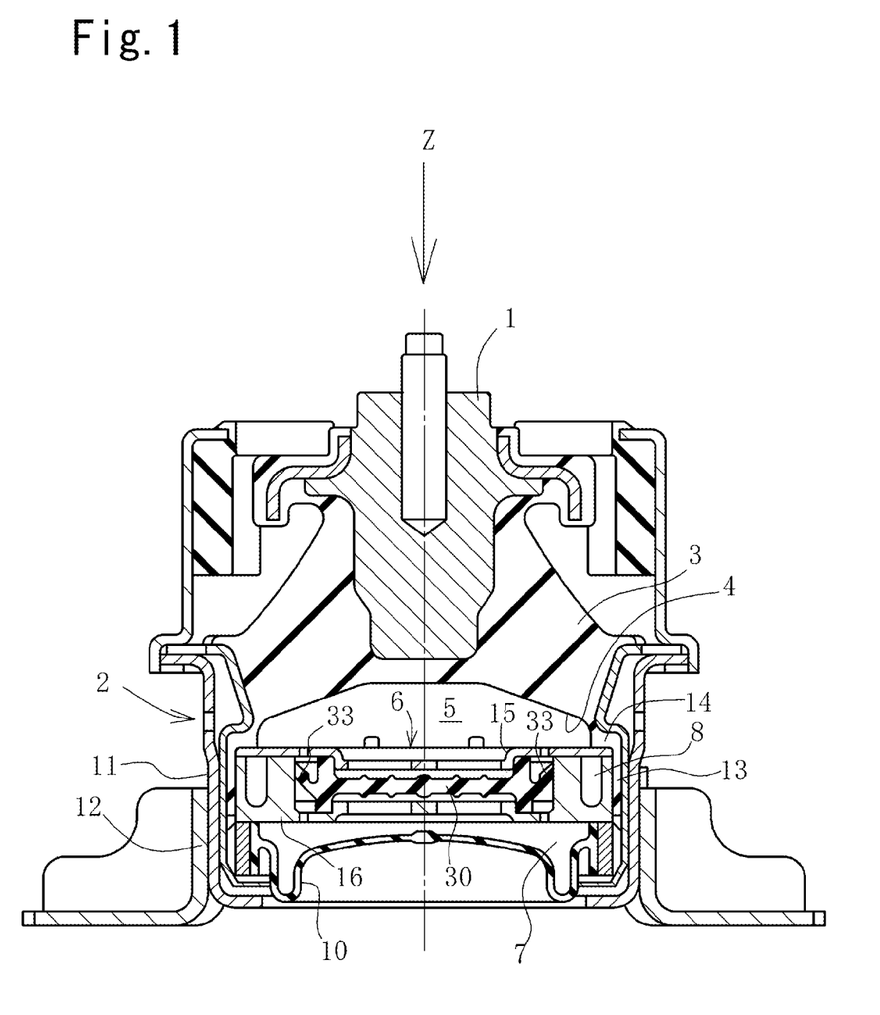
FIG. 1 is a longitudinal cross sectional view of an engine mount according to a first embodiment of the present invention.
Figure 2:
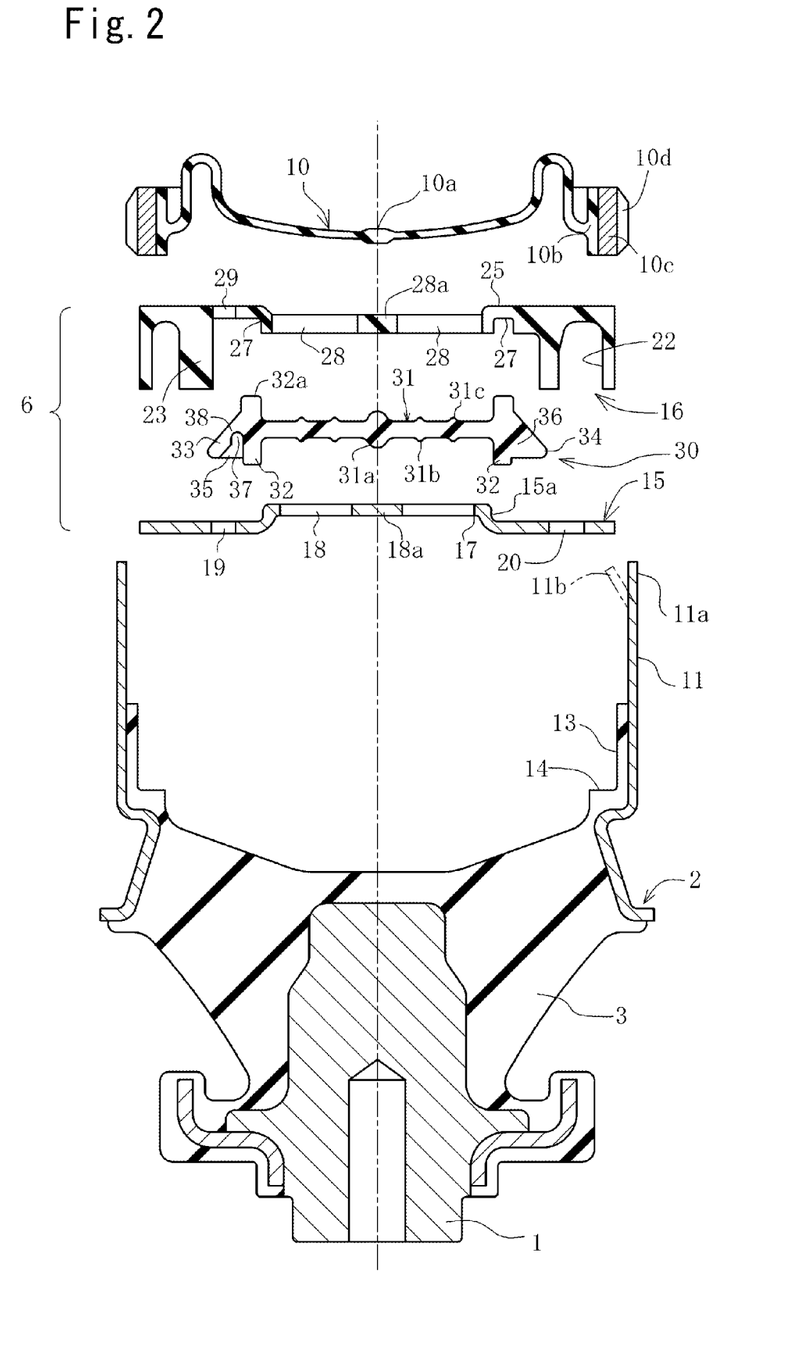
FIG. 2 an exploded view of component elements of the engine mount as above.

Hereinafter, the embodiment of an engine mount for a motor vehicle will be explained with reference to the accompanying drawings. FIG. 1 through FIG. 10 shows a first embodiment, wherein FIG. 1 is a longitudinal cross sectional view of the engine mount, and FIG. 2 is an exploded view of components elements thereof. FIG. 1 is also a cross sectional view taken along an input direction Z of a principal vibration. In the following explanation, each expression of the directions such as upward, downward, right and left or the like is used based on an illustrated state in FIG. 1.

Referring now to these drawings, this engine mount is provided with a first mounting member 1 to be mounted on the side of an engine (not shown) which is a vibration source, a second mounting member 2 to be mounted on the side of a vehicle body (not shown) which is a vibration receiving side, and an insulator 3 connecting these members. The insulator 3 is formed of a publicly known vibration isolating rubber and is an elastic body acting as a principal portion of vibration isolation. The vibration inputted into the first mounting member 1 in the direction of Z is absorbed at first by elastic deformation of the insulator 3.

The insulator 3 has a cross section substantially in a frustoconical shape and is provided with a dome portion 4 on the inside thereof. A downwardly open recessed portion is formed by the dome portion 4 and an incompressible hydraulic liquid is sealed in this recessed portion so as to form a primary liquid chamber 5.

The primary liquid chamber 5 is sectioned off from a secondary liquid chamber 7 by a partition member 6 and is in communication with the secondary liquid chamber 7 through an orifice passage 8 which is formed, in the shape of an arc when viewed in the Z direction, in an outer peripheral portion of the partition member 6 (communication ports provided on both ends of the orifice passage 8 to communicate with each of the liquid chambers, are not shown in this drawing). The orifice passage 8 is formed and set as a damping orifice which can provide a high damping performance by resonating with the vibration of low frequency consisting of a shake vibration, etc. of about 10~11 Hz. The secondary liquid chamber 7 is formed between a diaphragm 10 and the partition member 6 and makes use of the diaphragm 10 as a portion of a wall thereof.

The second mounting member 2 is provided with an outer metallic cylinder 11 of a cylindrical shape. This outer metallic cylinder 11 is mounted through a bracket 12 on the side of the vehicle body, depending on the situation. The outer metallic cylinder 12 constitutes a component element of the second mounting member 2. On the inside of the outer metallic cylinder 11 an extended portion 13 of the insulator 3 is integrally provided. The extended portion 13 extends downwardly up to a same level as the partition member 6 so as to integrally cover an inner wall of the outer metallic cylinder 11. A portion of an upper region of the extended portion 13 which faces the primary liquid chamber 5 is formed with a thick shoulder 14 through which an outer peripheral end of the partition member 6 is positioned.

As apparent from FIG. 2, the partition member 6 has an upper plate 15 and a lower holder 16 each separated upwardly and downwardly. An elastic movable diaphragm 30 is held centrally between the upper plate 15 and the lower holder 16. The orifice passage 8 is provided in the outer portion in the radial direction of the elastic movable diaphragm 30 (FIG. 1). Also, in an outer peripheral portion of the elastic movable diaphragm 30 there is provided a relief valve 33 which is adapted to open and close a leak passage communicating between a leak hole 19 on the side of the primary liquid chamber 5 and a leak hole 29 on the side of the secondary liquid chamber 7 and, when opened, to leak the hydraulic liquid from the secondary liquid chamber 7 to the primary liquid chamber 5. Further, the elastic movable diaphragm 30 faces the primary liquid chamber 5 and the secondary liquid chamber 7 through an upper central opening 18 of the upper plate 15 and a lower central opening 28 of the lower holder 16 so as to be elastically deformed by the hydraulic pressure fluctuation to absorb the internal pressure fluctuation.

The diaphragm 10 is provided with a thin main body portion 10a and a thick portion 10b being integrally formed on an outer peripheral portion thereof. A fixing ring 10c is inserted in the thick portion 10b and formed integral therewith. A seal portion 10d formed by a portion of the thick portion 10b projects outwardly in the radial direction. The fixing ring 10c is press-fitted into the inside of the outer metallic cylinder 11 through the seal portion 10d of the thick portion 10b. Each of upper and lower end walls of the fixing ring 10c is exposed, and the upper end wall abuts on an outer periphery of the bottom of the lower holder 16. The lower end wall of the fixing ring 10c is caulked and fixed by the lower end of the outer metallic cylinder 11.

When assembling this engine mount, as shown FIG. 2, firstly, there is made a sub-assembled body that the first mounting member 1, the second mounting member 2 and the insulator 3 are united together. After turning this sub-assembled body upside down from the state as shown in FIG. 1, the partition member 6 is fitted into the inside of the outer metallic cylinder 11 and positioned on the shoulder 14. Then, the fixing ring 10c of the diaphragm 10 is press-fitted into the inside of the outer metallic cylinder 11 in such a manner as to come into contact with the upper wall, in the state as shown in FIG. 2, of the partition member 6. Thereafter, the distal end of the outer metallic cylinder 11 is bent inwardly to form the bent portion 11a in such a manner as to come into pressure contact with the upper end wall, in the state as shown in FIG. 2, of the fixing ring 10c, so that the whole is assembled into a unit.

Figure 3:
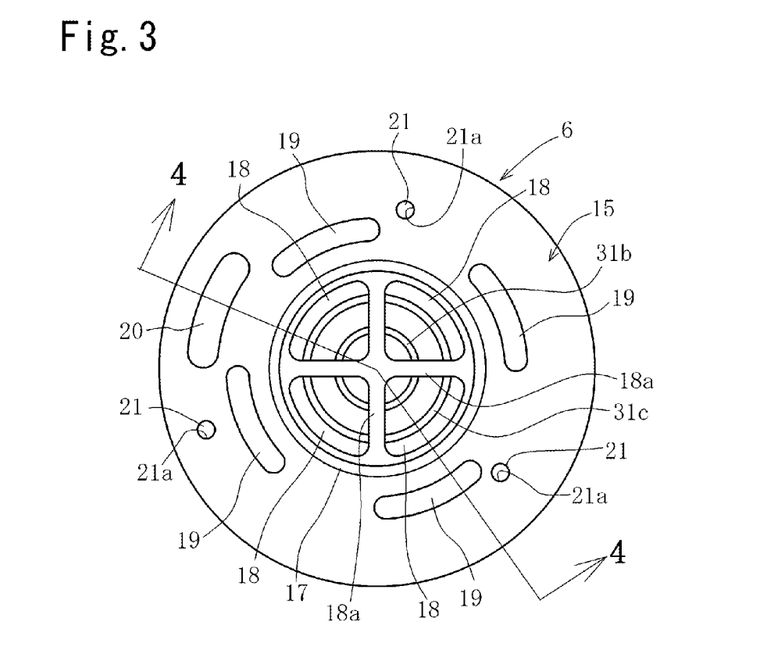
FIG. 3 is a plan view of a partition member in an assembled condition.
Figure 4:
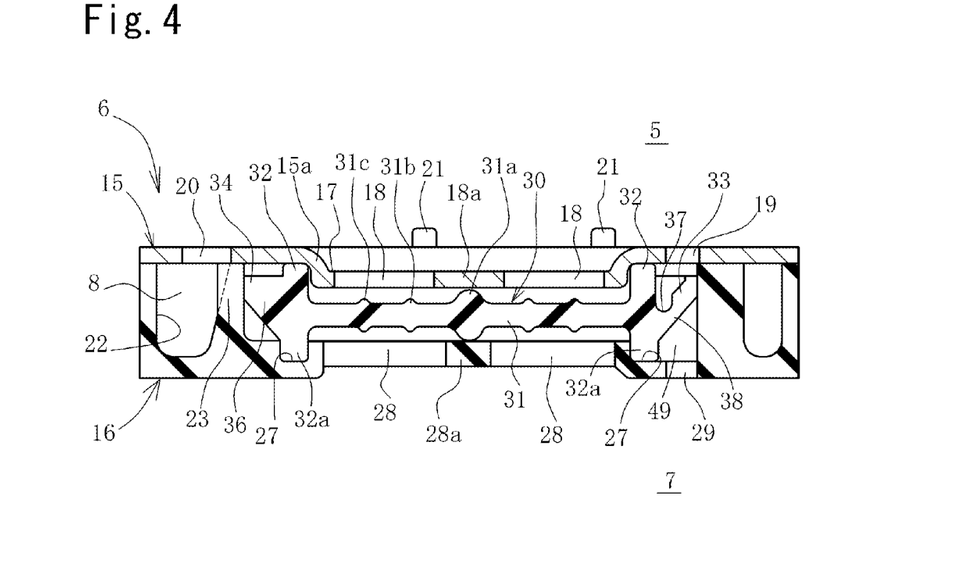
FIG. 4 is a cross sectional view taken along line 4-4 of FIG. 3.

FIG. 3 is a plan view of the partition member 6 and FIG. 4 is a cross sectional view taken along line 4-4 of FIG. 3. As shown in these drawings, the partition member 6 is a hollow frame-like member which is circular in a plan view. The upper plate 15 and the lower holder 16 each have rigidity and are made of a proper material such as light metal, hard resin or the like. The upper plate 15 is in the shape of a circular plate and has a one-step lowered central step portion 17 on which an upper central opening 18 communicating with the primary liquid chamber 5 is formed and partitioned by a cross-shaped deformation restraint frame 18a. On the outer peripheral side of the central step, leak holes 19 of a circular-arced slot shape are arranged four in all at intervals of 90 degrees on the same circumferential periphery.

As shown in FIG. 4, the reference character 20 denotes an opening of the orifice passage 8 on the side of the primary liquid chamber 5. The reference character 21 denotes a positioning projection which projects from the lower holder 16. When the positioning projections 21 are fitted into small bores 21a formed in the upper plate 15, the upper plate 15 and the lower holder 16 are fixed in position and combined together.

On the outer peripheral portion of the lower holder 16 there is provided an upwardly open arc-shaped groove 22 for forming the orifice passage 8. The elastic movable diaphragm 30 is housed in an inside space surrounded by an annular partition wall 23 which is formed by an inner wall of the arc-shaped groove 22. In a central portion of a bottom 25 of the lower holder 16 there is formed a lower central opening 28 which is in communication with the secondary liquid chamber 7. The reference character 28a denotes a deformation restraint frame.

The elastic movable diaphragm 30 is a member for absorbing through elastic deformation the internal pressure fluctuation of the primary liquid chamber 5 and has a central thin portion 31, a fixing portion 32 and a relief valve 33 integrally formed on the outer peripheral side of the fixing portion 32. The central thin portion 31 faces the upper central opening 18 and the lower central opening 28 and is adapted to be elastically deformed by the hydraulic liquid going in and out through these openings 18 and 28 while being restrained excessive deformation by the cross-shaped deformation restraint frames 18a and 28a. On the central thin portion 31 there are integrally formed a plurality of concentrically arranged protrusions 31a and circular projections 31b, 31c which, when the central thin portion 31 is elastically deformed, are adapted to come into initial contact at a small contact area with the upper plate 15 and the lower holder 16.

Figure 8:
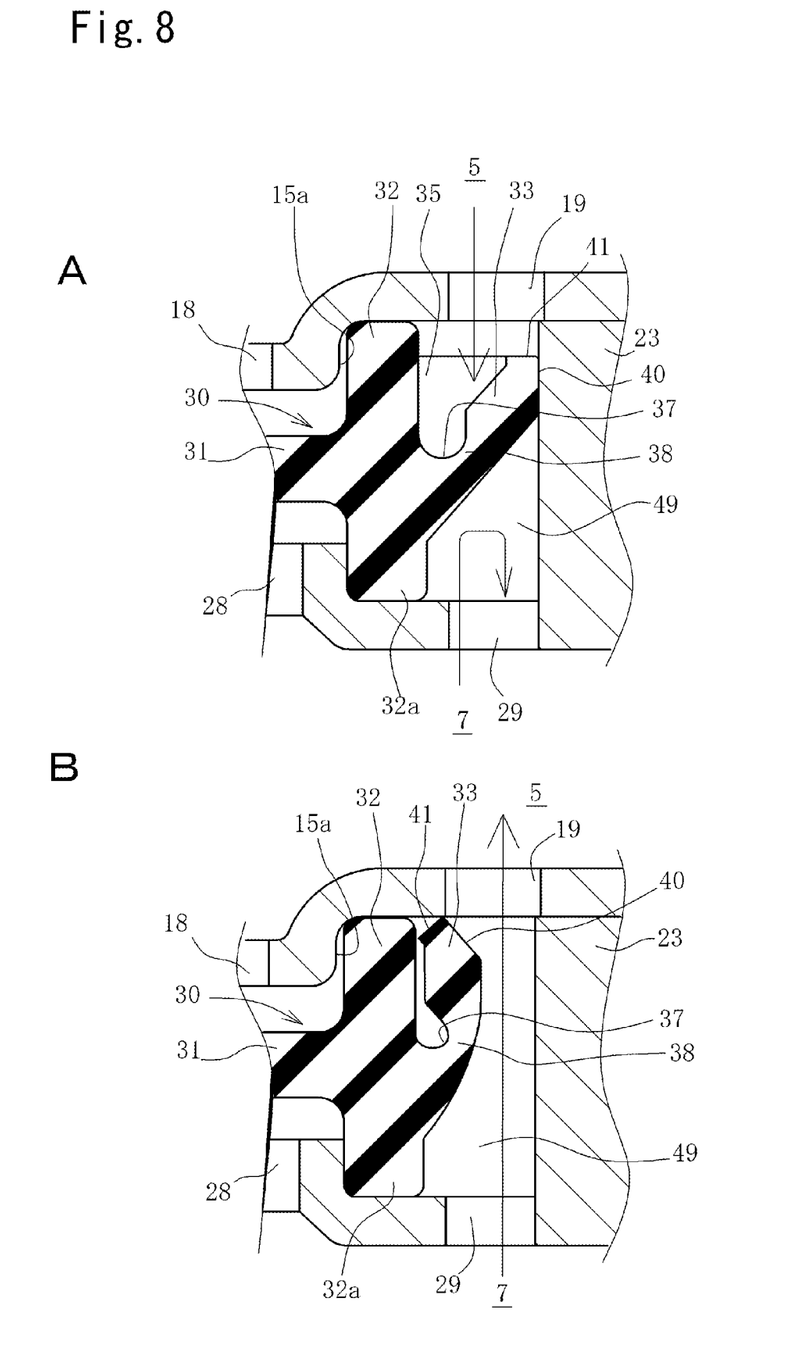

The fixing portion 32 is a thick and rigid annular wall formed on the outer peripheral side of the central thin portion 31, and is held and fixed between the upper plate 15 and the lower holder 16 in the upward and downward direction in such a manner that an upper portion thereof is positioned by a shoulder portion 15a (see FIG. 8) formed on the outer peripheral side of the central step portion 17 of the upper plate 15 while a lower portion 32a thereof is engaged with an annular groove 27 to be fixed in position. Also, the fixing portion 32 functions as an annular support of the central thin portion 31.

Figure 5:
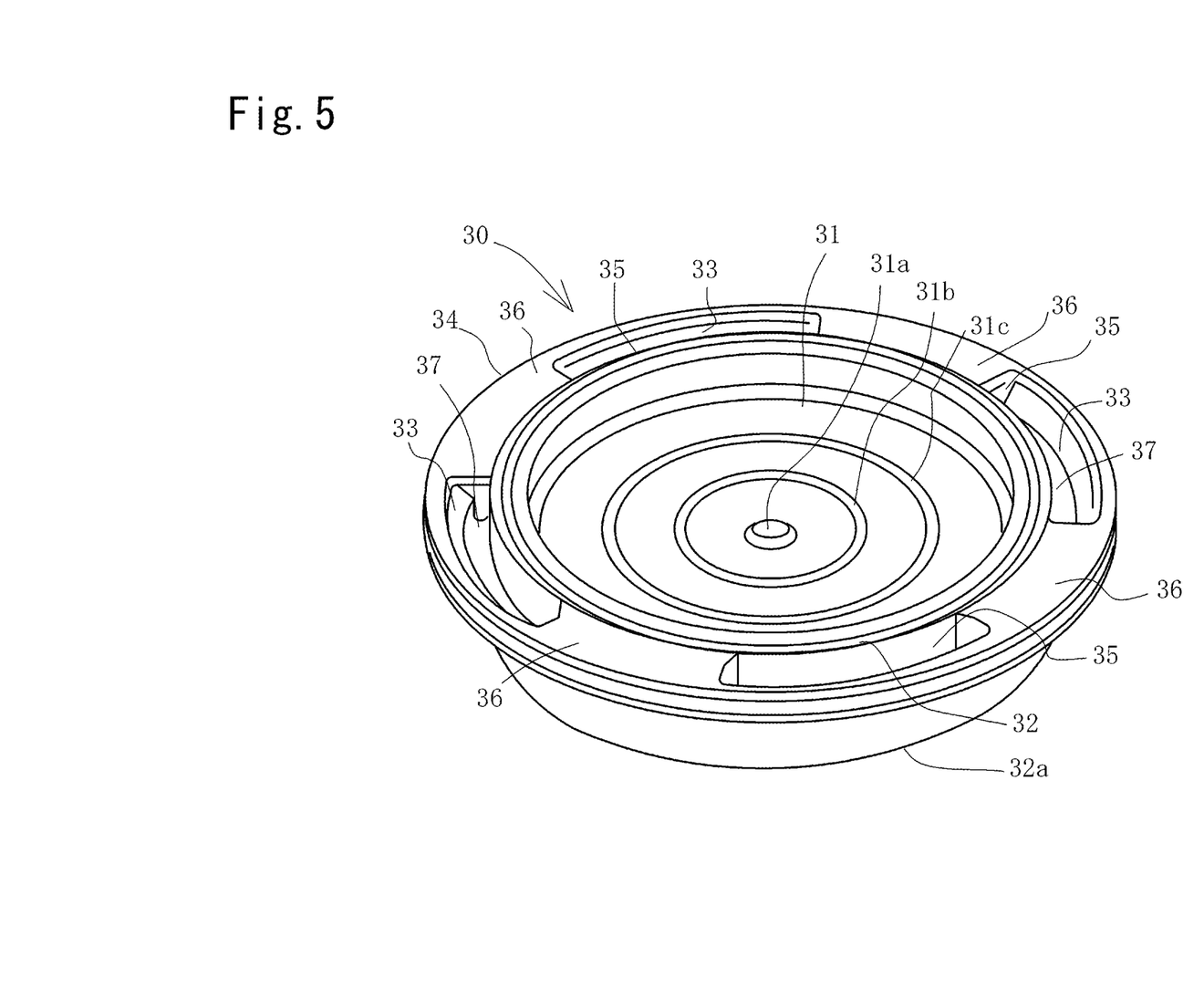
FIG. 5 is a perspective view of an elastic movable diaphragm.
Figure 6:
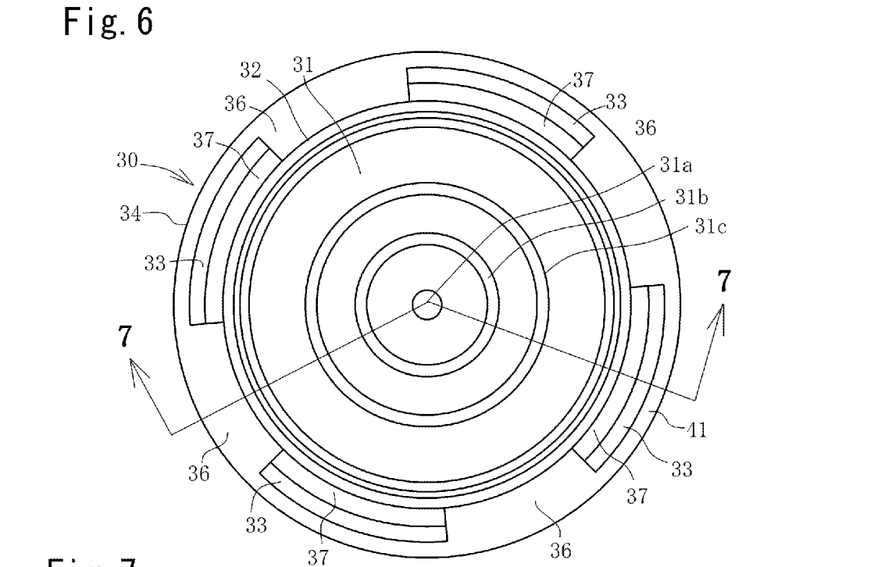
FIG. 6 is a plan view of the elastic movable diaphragm.
Figure 7:
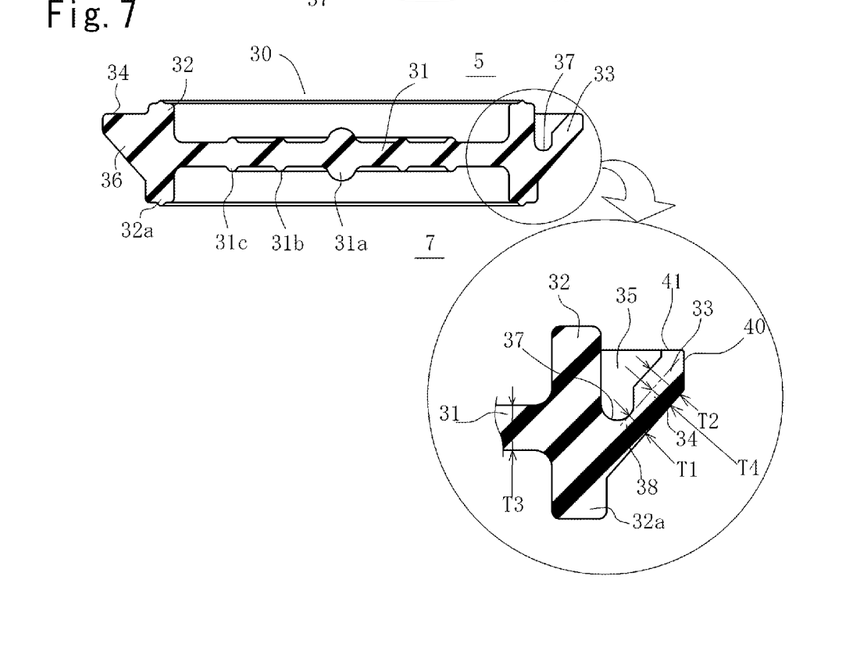
FIG. 7 is a cross sectional view taken along line 7-7 of FIG. 6.

FIG. 5 is a perspective view of the elastic movable diaphragm 30, FIG. 6 is a plan view of the elastic movable diaphragm 30, and FIG. 7 is a cross sectional view taken along line 7-7 of FIG. 6. As shown in these drawings, the elastic movable diaphragm 30 is made of a proper elastomer such as rubber or the like. The elastic movable diaphragm 30 has a fixing portion 32 of an annular wall on the outer peripheral portion, and an outer peripheral flange portion 34 protruding outwardly in the radial direction from the fixing portion 32. The relief valves 33 formed in a circular-arced shape in a plan view and reduced in thickness by providing a circumferentially extending concave 35 are arranged at intervals of 90 degrees in the outer peripheral flange portion 34. Between neighboring relief valves 33 there are provided solid thick portions 36. Accordingly, on the outer peripheral flange portion 34, the relief valve 33 and the solid thick portion 36 are arranged alternately in the circumferential direction.

The outer peripheral flange portion 34 including the solid thick portion 36 is formed in a substantially triangular shape in cross section (see FIG. 7) having an upwardly inclined wall in the radially outward direction by cutting obliquely a lower portion thereof located on the side of the secondary liquid chamber 7. The solid thick portion 36 corresponds to the one formed by filling the concave portion 35 and has high rigidity.

The relief valve 33 is formed by removing a portion other than the solid thick portion 36 in the outer peripheral flange portion 34 so as to provide the upwardly open concave portion 35. The relief valve 33 is thinned by the thickness of the concave portion 35 in comparison with the solid thick portion 36. Thus thinned relief valve 33 alternates with the solid thick portion 36 in the circumferential direction of the outer peripheral flange portion 34, whereby a difference in rigidity is created between the solid thick portion 36 and the relief valve 33 with respect to the outer peripheral flange portion 34 of the elastic movable diaphragm 30.

Namely, in the outer peripheral flange portion 34, the relief valve 33 is formed thin and soft and other portion formed by the solid thick portion 36 is hardened. This difference in rigidity has the hydraulic liquid, when leaking, concentrated in the easily deformable relief valve 33 to promptly deform the relief valve 33 thereby to start leaking assuredly. Thus, the relief valve 33 is accurately opened. Herein, the degree of the difference in rigidity may be determined freely, and the hardness of the relief valve 33 may be adjusted by the number, width, depth, etc. of the concave portions 35.

The relief valve 33 is integrally formed on the outer peripheral side of the fixing portion 32 and is provided as an inclined wall surrounding the concave portion 35 which is open to the primary liquid chamber 5. Incidentally, the lateral walls in the circumferential direction which surround the concave portion 35 together with the relief valve 33 are formed by circumferential ends of the solid thick portion 36. The incline wall forming the relief valve 33 is upwardly inclined in the radially outward direction thereby to facilitate the flow of the hydraulic liquid from the secondary liquid chamber 7 to the primary liquid chamber 5.

The basal portion of the relief valve 33 connected to the fixing portion 32 is provided with an opening and closing adjustment groove 37 to form a thin bending portion 38 so as to facilitate the bending of the relief valve 33 in an opening and closing operation. The opening and closing adjustment groove 37 is formed in such a way as to engrave the inside of the basal portion downwardly so as to be opened upwardly and is in the shape of an arced circumferentially extending groove which extends along an arc (see FIG. 5), in a plan view, of an opening end of the concave portion 35.

With provision of the opening and closing adjustment groove 37, the basal portion of the relief valve 33 is constituted as the thin bending portion 38, and the elasticity of the thin bending portion 38 which has a great influence upon the opening and closing operation of the relief valve 33 is adjusted. On the distal end of the relief valve 33 there are formed a seat surface 40 which come into close contact with the annular partition wall 23 and an edge rib 41. The seat surface 40 is formed substantially parallel with the annular partition wall 23 and is capable of adhering closely to the inner peripheral surface of the annular partition wall 23 in a liquid sealed fashion with a comparatively large sealing area. The edge rib 41 is formed into a thick wall to provide rigidity on the distal end of the relief valve 33 whereby the distal end of the relief valve 33 can be uniformly deformed over the whole length in the circumferential direction.

When the thickness of the thin bending portion 38 is T1 and the general thickness of the relief valve 33 is T2, the relation is T1<T2 and in this embodiment, T1 is set to about 0.6 times as thin as T2. Moreover, this general thickness T2 is substantially the same thickness as the general thickness T3 of the central thin portion 31. In addition, the general thickness T2 of the relief valve 33 corresponds to the average thickness of the relief valve 33 excluding the thin bending portion 38 and the distal end which constitute thickness changing portions. Similarly, the general thickness T3 of the central thin portion 31 corresponds to the average thickness excluding the rib portion of which thickness becomes greater partially.

As the thickness T1 of the thin bending portion 38 becomes thinner, the relief valve 33 is able to be bent and opened toward the fixing portion 32 at a small force by using the opening and closing adjustment groove 37 as the starting point of bending when the relief valve 33 receives the hydraulic pressure in the upward direction of the drawing. On the contrary, the portion of the relief valve 33 between the thin bending portion 38 and the seat surface 40 is thickened and set to the condition that it has a sufficient rigidity to provide the high damping when the relief valve 33 is in a closed state.

By the way, the reference character T4 in FIG. 7 denotes the thickness of a comparative example that the thickness of the relief valve 33 is not increased. Namely, T4 corresponds to the thickness of a bottom of the opening and closing adjustment groove 37 of the relief valve 33. T4 is substantially the same thickness as T1.

The thickness T1 of the thin bending portion 38 and the general thickness T2 of the relief valve 33 are freely determined, each depending upon specifications considering the balance between the rigidity necessary for the high damping and the easiness of bending by the predetermined hydraulic pressure of the thin bending portion 38. However, it is preferable that T2 is adjusted within a range of 1.5~3 times as thick as T1 in order to balance the rigidity with the easiness of bending. When T2 is about twice as thick as T1, it is easy to strike a balance between the rigidity and the easiness of bending. When T2/T1 is more than three times, the rigidity of the relief valve is decreased and the sealing performance at the time of no leaking is deteriorated. On the other hand, when being less than 1.5 times, it is not possible to provide sufficient opening at the time of leaking. In this embodiment, T1 is 1.5 mm and T2 is 2.5 mm, so that T2 is 1.66 times as thick as T1.

FIG. 8 is a view for explaining an operation of the relief valve, wherein FIG. 8-A is a cross sectional view showing the location around the relief valve 33 at the time of no leaking, and FIG. 8-B is a similar view at the time of leaking.

The relief valve 33 is provided with the concave portion 35 which faces the leak hole 19 to be opened to the leak hole 19. The relief valve 33 facing this concave portion 35 is able to be opened and closed in such a manner as to be bent at the thin bending portion 38. Also, the relief valve 33 receives and bears the hydraulic pressure which comes through the leak hole 19 from the main liquid chamber 5, while it is inclined in such a direction as to release the hydraulic pressure coming through the leak hole 29 from the secondary liquid chamber 7 so as to open and close the leak passage 49.

The leak passage 49 constitutes a flow channel of the hydraulic liquid passing through the partition member 6 and communicates between the leak hole 19 and the leak hole 29. The leak passage 49 is provided between the fixing portion 32 formed by the outer peripheral portion of the elastic movable diaphragm 33 and the inner peripheral wall of the annular partition wall 23 and is opened and closed by the relief valve 33. The relief valve 33 is closed when the seat surface 40 of the relief valve 33 adheres closely to the inner peripheral wall of the annular partition wall 23, so as to close the leak passage 49 (FIG. 8-A), and is opened when the relief valve 33 is bent at the thin bending portion 38 and the seat surface 40 is separated from the annular partition wall 23, so as to open the leak passage 49.

When the relief valve 33 is opened, the hydraulic liquid is leaked from the secondary liquid chamber 7 to the primary liquid chamber 5 through the leak holes 19 and 29 which are formed in each of the outer peripheral portions of the upper plate 15 and lower holder 16 (FIG. 8-B). In the normal condition as shown in FIG. 8-A, however, the seat surface 40 of the relief valve 33 is in close contact in a liquid sealed fashion with the inner peripheral wall of the annular partition wall 23 to have the leak passage 49 blocked off, so that the relief valve 33 is in the valve closing state that the communication between the leak holes 19 and 29 is cut off.

In FIG. 8-A, when the internal pressure of the primary liquid chamber 5 is decreased and comes to the predetermined level approaching zero atmospheric pressure, the hydraulic pressure on the side of the secondary liquid chamber 7 which presses up the relief valve 33 is relatively increased. Soon after that, the relief valve 33 is bent at the thin bending portion 38 to come closer to the fixing portion 32, and the seat surface 40 is separated from the annular partition wall 23, whereby the leak passage 49 is opened and turns into the valve opening state that communicates between the leak holes 19 and 29, so that the hydraulic liquid in the secondary liquid chamber 7 flows into the primary liquid chamber 5 through the leak passage 49 (FIG. 8-B).

The level of the internal pressure of the primary liquid chamber 5 being used as a reference for starting this valve opening operation can be freely adjusted by varying the hardness in the opening and closing operation of the relief valve 33. The hardness in the opening and closing operation of the relief valve 33 can be set to an optional opening and closing setting value by adjusting the thickness of the thin bending portion 38. Considering that the cavitation phenomenon occurs when the pressure within the primary liquid chamber 5 is decreased and approaches an absolute vacuum pressure, it is preferable that the opening and closing setting value is set to the value unlimitedly close to vacuum as a predetermined level. For example, it is set to open at about 0.1 atm.

Next, the operation of the embodiment will be explained with reference mainly to FIG. 1 and FIG. 8. In FIG. 1, when the large vibration is inputted to the primary liquid chamber 5, the primary liquid chamber 5 is compressed and the hydraulic liquid is sent out to the secondary liquid chamber 7. Then, the hydraulic liquid in the primary liquid chamber 5 is pressurized and push the upper wall of the relief valve 33 downwardly toward the secondary liquid chamber 7, as shown by an arrow in FIG. 8-A. As the seat surface 40 of the relief valve 33 is previously pressed on the inner peripheral surface of the annular partition wall 23, it adheres further closely to the annular partition wall 23 in a higher liquid sealed fashion to increase a sealing efficiency.

Then, since the relief valve 33 surrounding the concave portion 35 has a certain degree of thickness to provide high rigidity, the liquid column resonance by the orifice passage 8 can be increased to obtain high damping by setting the relief valve 33 such as not to be elastically deformed by the hydraulic pressure of a predetermined level.

After that, when the direction of vibration is inverted and the volume of the primary liquid chamber 5 rapidly returns to the state before compression, the hydraulic liquid moves through the orifice passage 8 thereby to make the return slow down, so that the inside of the primary liquid chamber 5 approaches instantaneously the vacuum state. FIG. 8-B shows this state. When the relief valve 33 is pulled on the side of the primary liquid chamber 5 and is pushed up by the hydraulic liquid on the secondary liquid chamber 7 to overcome the rigidity of the relief valve 33, the relief valve 33 has the thin bending portion 38 elastically deformed at the opening and closing adjustment groove 37 as the starting point of bending and rotates on the side of the fixing portion 32. The relief valve 33 is opened when the seat surface 40 is separated from the inner peripheral surface of the annular partition wall 23, thereby to have the hydraulic liquid in the secondary liquid chamber 7 leaked through the leak hole 29 and the leak hole 19 from the secondary liquid chamber 7 to the primary liquid chamber 5.

In particular, since the relief valve 33 is formed with the inclined surface, the hydraulic liquid on the side of the secondary liquid chamber 7 is guided by the incline surface and concentrated on the tip of the relief valve 33, whereby the relief valve 33 is smoothly deformed in such a way as to be gradually turned over from the tip thereof.

In this way, a large amount of the hydraulic liquid is smoothly leaked from the leak hole 19 to the primary liquid chamber 5 thereby to assuredly prevent the occurrence of the cavitation phenomenon within the primary liquid chamber 5. Moreover, since the opening and closing adjustment groove 37 extends in the circumferential direction, and the relief valve 33 is thick enough to provide comparatively high rigidity, the whole is bent uniformly at the opening and closing adjustment groove 37 as the starting point without locally irregular elastic deformation, whereby the relief valve 33 is opened accurately to let the leak occur at all the outer peripheral portion of the relief valve 33. At that time, the edge rib 41 also contributes to the increase in rigidity of the relief valve 33. In addition, the relief valve 33 is located on the inner peripheral side of the annular partition wall 23 and has an extending length in the circumferential direction, whereby the opening area is wide enough to leak instantaneously the large amount of the hydraulic liquid so as to assuredly prevent the occurrence of the cavitation phenomenon.

Figure 9:
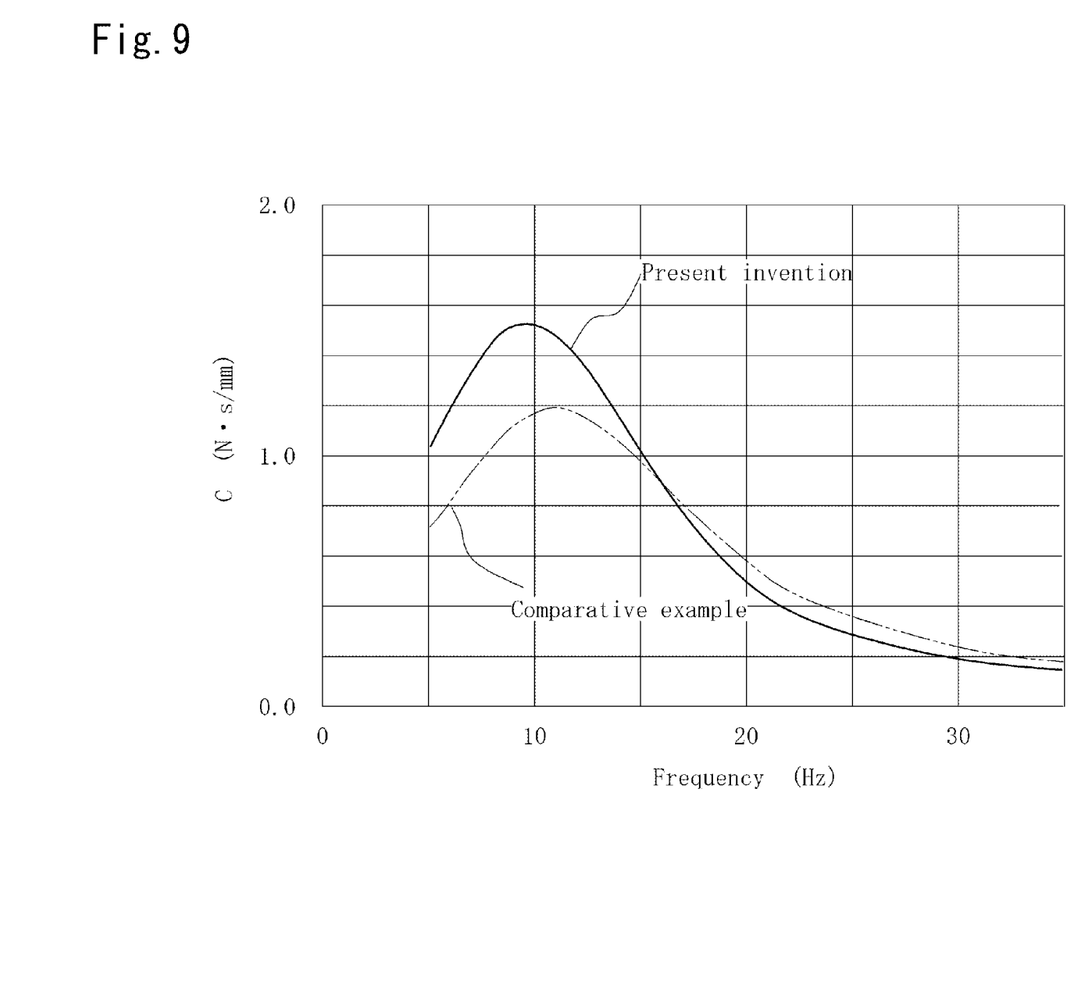
FIG. 9 is a graph showing a dynamic spring characteristic.

FIG. 9 is a graph showing a dynamic spring characteristic, wherein the horizontal axis denotes frequency and the vertical axis denotes damping force. As clearly shown in this graph, the damping force of the present invention indicated by a solid line creates the maximum value by the liquid column resonance of about 10 Hz. On the other hand, the damping force of the comparative example of thickness T4 in FIG. 7 indicated by a phantom line creates also the maximum value of damping at about 10 Hz, but the value is smaller than that of the present invention. Thus, the present invention can provide about 18% larger damping than the comparative example and it is understood that it can realize the high damping efficiency.

Figure 10:
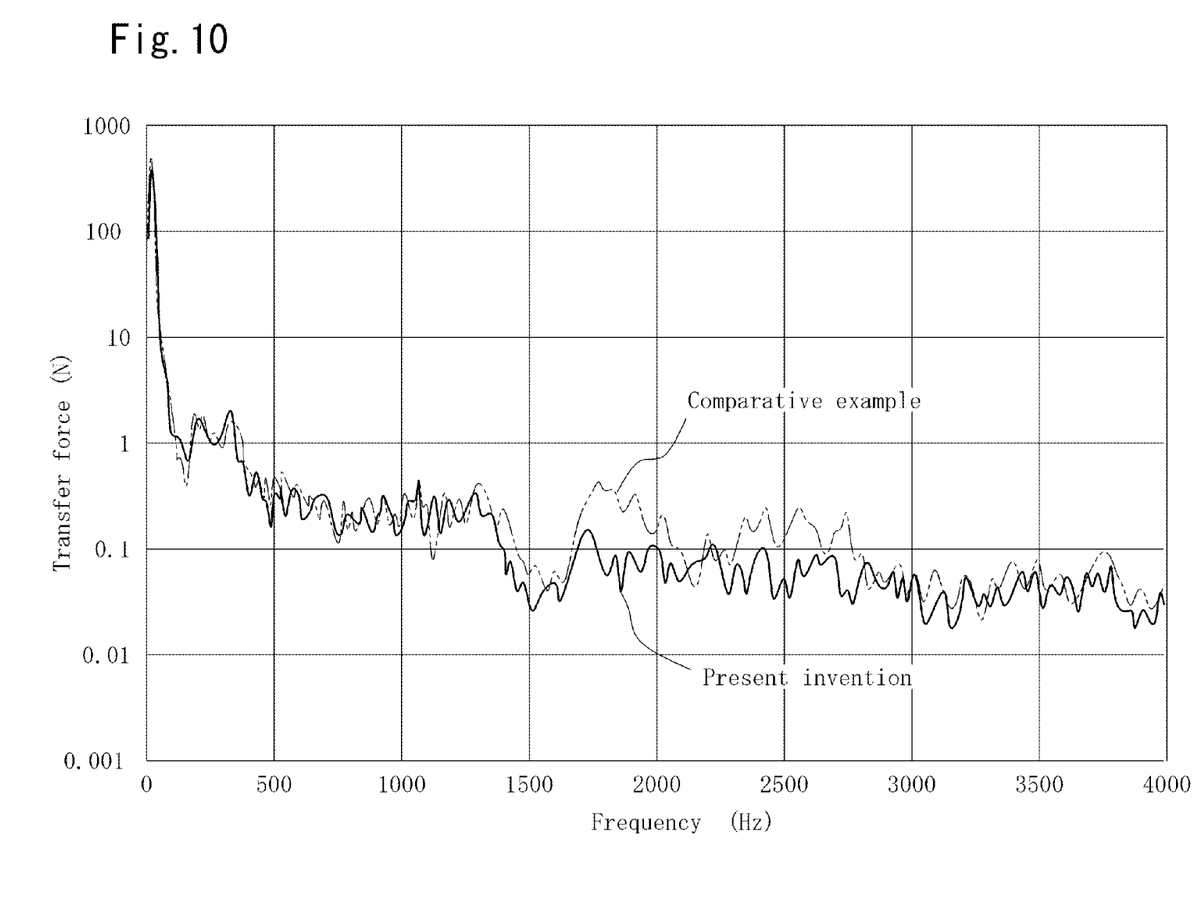
FIG. 10 is a graph showing a transfer characteristic.

FIG. 10 is a graph showing the comparison of prevention effect with respect to the cavitation phenomenon between the present invention and the comparative example as above, wherein the horizontal axis denotes a constituent frequency and the vertical axis denotes transfer force. It is shown that the cavitation phenomenon can be effectively prevented as the transfer force is decreased in each of constituent frequencies. As apparent from this graph, in the constituent frequency range of 1000 Hz or greater in which the cavitation phenomenon is called into question, the transfer force of the present invention is equal to or below that of the comparative example in almost all the range. Accordingly, it is understood that the present invention is equal to or more effective than the comparative example in preventing the occurrence of the cavitation phenomenon.

Therefore, according to the construction of the present invention, the relief valve 33 is made thick enough not to be elastically deformed easily so as not to absorb the hydraulic pressure fluctuation of the primary liquid chamber 5, thereby making possible the high damping by the orifice passage 8 functioning as the damping orifice. At the same time, by providing the opening and closing adjustment groove 37, the thin bending portion 38 is easily bent at this opening and closing adjustment groove 37 as the starting point of bending so as to carry out the rapid opening and closing of the relief valve 33, thereby making the assured prevention of the cavitation phenomenon possible. Thus, the realization of the high damping and the prevention of the cavitation phenomenon can be accomplished simultaneously.

Further, since the general thickness T2 of the relief valve 33 excluding the thin bending portion 38 is made not less than 1.5 times as thick as the thickness T1 of the thin bending portion 38, the relief valve 33 other than the thin bending portion 38 can be made thick enough to provide high rigidity, thereby making it easy to properly balance the rigidity with the easiness of bending.

Furthermore, since the opening and closing adjustment groove 37 is provided long in the circumferential direction on the basal portion of the relief valve 33, the relief valve 33 can be bent along the circumferentially extending opening and closing adjustment groove 37, and the opening and closing operation of the circumferentially extending relief valve 33 can be easily carried out.

Figure 11:
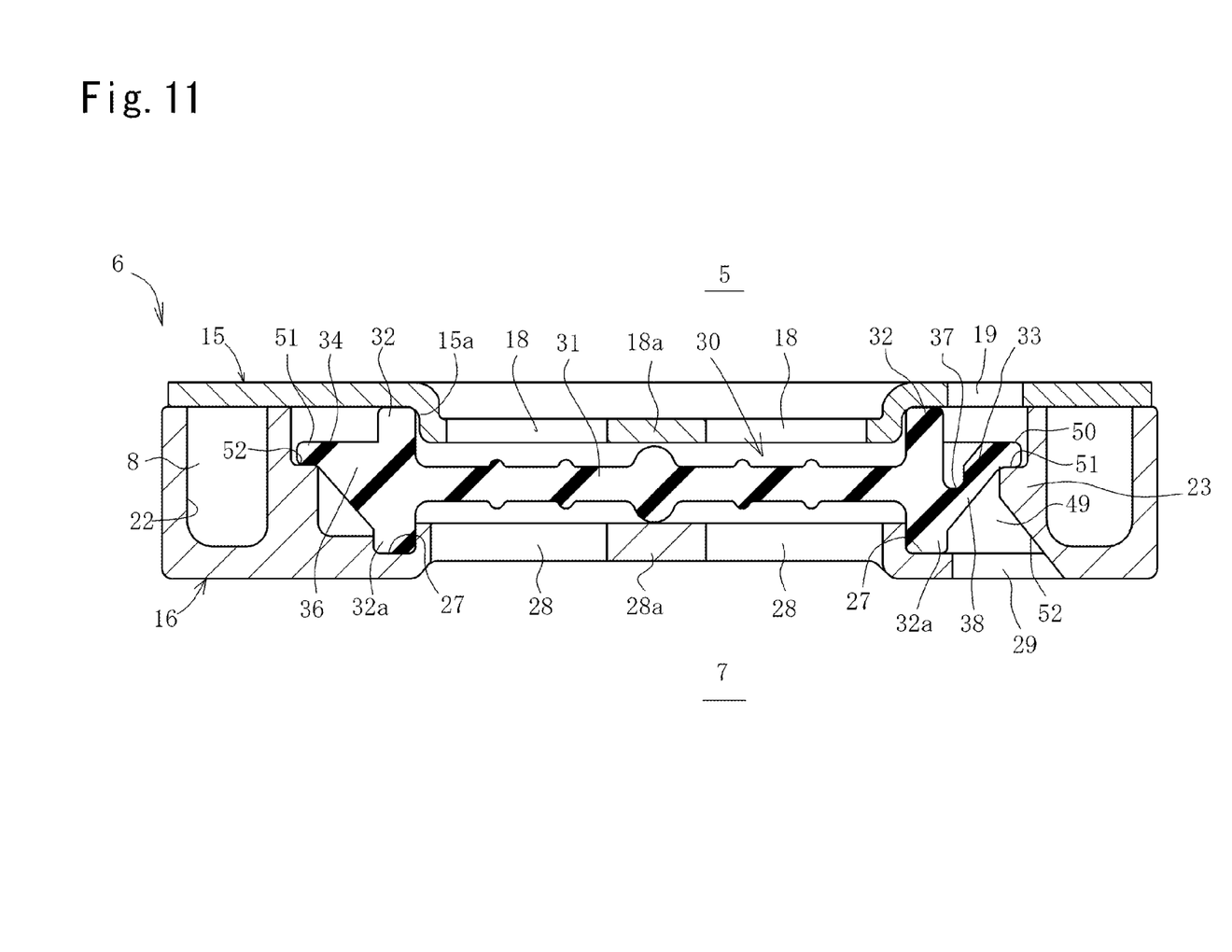
FIG. 11 is a cross sectional view of the partition member according to a second embodiment of the present invention.

FIG. 11 is a sectional view of the partition member 6 in accordance with a second embodiment. In this embodiment, the modifications are made only partly to the elastic movable member or the like, and other component elements are identical to the first embodiment so that the explanation will be omitted. In addition, like reference characters designate like or corresponding parts throughout the explanation made hereunder. In this embodiment, the partition member 6 is so arranged that the hydraulic pressure of the primary liquid chamber 5 is applied substantially in a vertical direction. A radially outwardly protruding protrusion 50 is provided circumferentially continuously on the outer peripheral portion of the outer peripheral flange portion 34. On the other hand, a radially inwardly protruding step-like stopper portion 51 is provided on the side of the inner peripheral wall of the annular partition wall 23, so as to form a substantially horizontal seat surface all over the circumference. In this way, the protrusion 50 is placed on the horizontal surface of the stopper portion 51 and supported on the side of the secondary liquid chamber 7.

Further, the radially widened leak hole 19 is provided on the upper plate 15 above the relief valve 33. The width of the leak hole 19 in the radial direction extends from the outer peripheral wall of the fixing portion 32 to the distal end of the protrusion 50. The leak hole 29 is also widened and provided on the lower holder 16, and the outward side in the radial direction thereof forms the lower end of an inclined surface 52 provided on the annular partition wall 23. The inclined surface 52 is formed on the inner peripheral portion of the annular partition wall 23 and extends from the position below the stopper portion 51 downwardly and gradually outwardly in the radial direction.

With this construction, in the case where the hydraulic pressure in the primary liquid chamber 5 acts in the substantially vertical direction, the protrusion 50, when closed, receives or catches the hydraulic pressure on the side of the primary liquid chamber 5 in the vertical direction and is pressed on the substantially horizontal stopper portion 51, whereby it is possible to provide the assured close adhesion thereby allowing the relief valve 33 to be accurately closed. Moreover, since during leaking, the leak hole 29 is widened enough to let the larger amount of the hydraulic liquid flow into the primary liquid chamber 5, and the hydraulic liquid is guided by the inclined surface 52 to the distal end of the relief valve 33, the valve opening operation can be carried out more assuredly. Also, the widening of the leak hole 19 can increase and speed up the flow of the hydraulic liquid into the primary liquid chamber 5.

Figure 12:
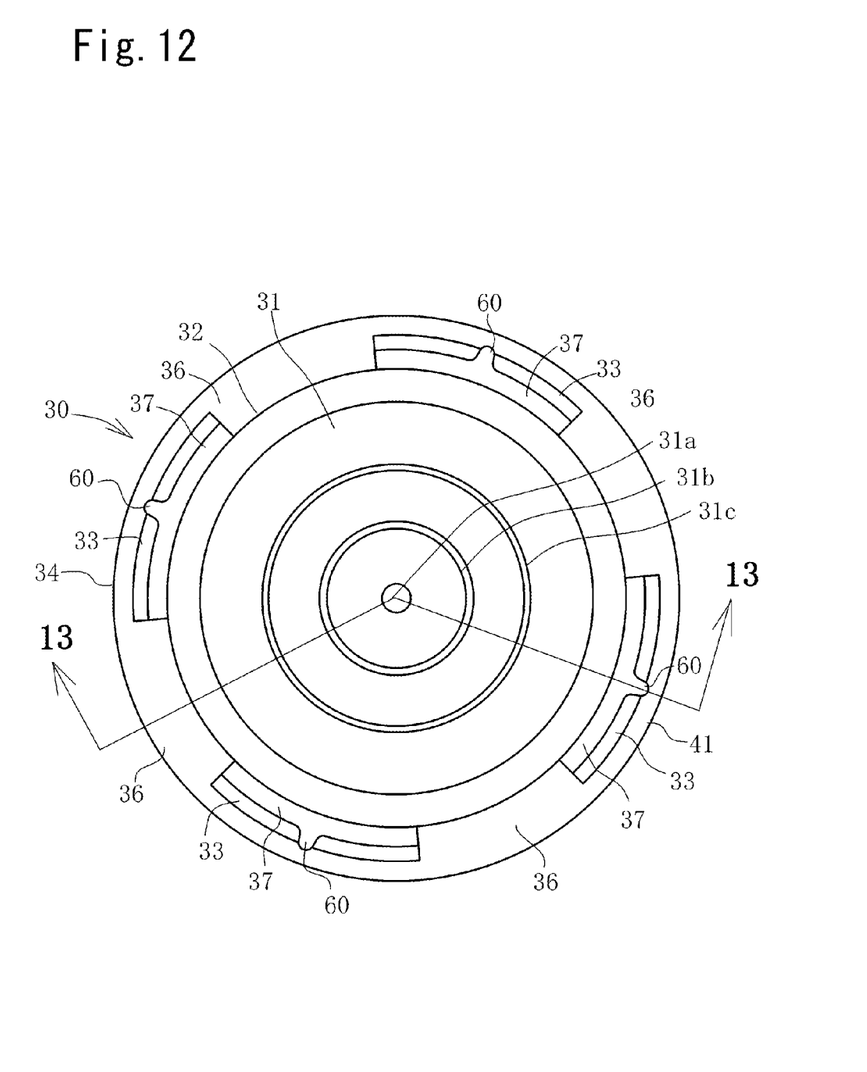
FIG. 12 is a plan view of the elastic movable diaphragm according to a third embodiment.
Figure 13:
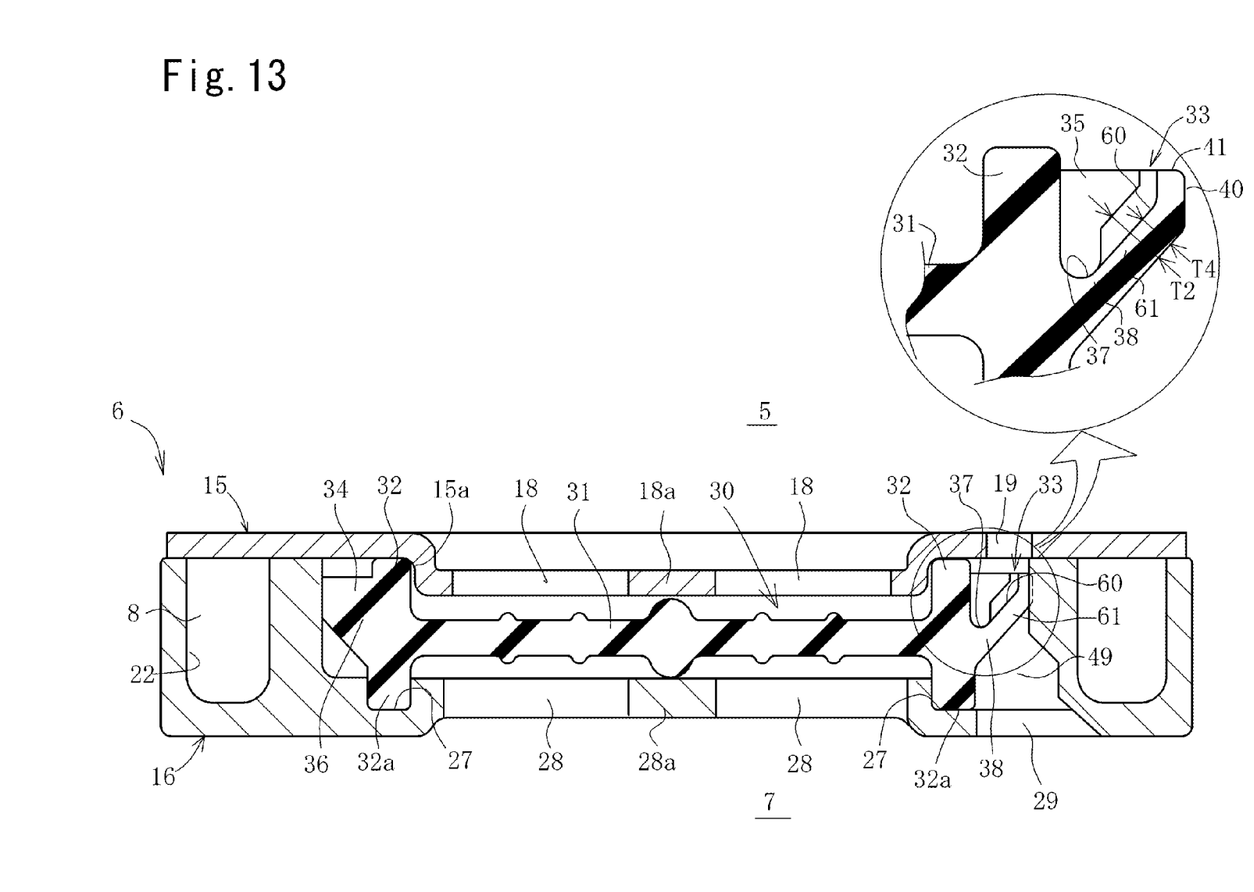
FIG. 13 is a cross sectional view taken along line 13-13 of FIG. 12.

FIGS. 12 and 13 show a third embodiment, wherein FIG. 12 is a plan view of the elastic movable diaphragm 30 and the FIG. 13 is a sectional view taken along line 13-13 of FIG. 12. In this embodiment, as shown in these drawings, a radially extending longitudinal groove 60 is formed in an intermediate portion in the circumferential direction of the relief valve 33. This longitudinal groove 60 functions as one of opening and closing adjustment grooves. On the other hand, the opening and closing adjustment groove 37 similar to the first embodiment is formed on the basal portion of the inclined wall in the circumferential direction. The longitudinal groove 60 is connected at the lower end thereof to the opening and closing adjustment groove 37 and extends at the upper end thereof into the edge rib 41 in the radially outward direction so as to divide the edge rib 41 into halves in the circumferential direction.

As shown in an enlarged view of FIG. 13, the thickness of the relief valve 33 in a location forming the longitudinal groove 60 is T4 similar to the thickness T1 of the thin bending portion 38 corresponding to the bottom of the opening and closing adjustment groove 37. A thin bending portion 61 is also formed along the longitudinal groove 60 in the intermediate portion of the relief valve 33.

With this construction, the relief valve 33 at the time of opening is bent at the thin bending portion 38 by using the opening and closing adjustment groove 37 as the starting point of bending, and at the same time, both sections in the circumferential direction of the relief valve 33 are bent at the longitudinal groove 60 as a starting point of bending. Then, since the relief valve 33 is fixed at both ends in the circumferential direction on the lateral walls, the hydraulic pressure concentrates on the intermediate longitudinal groove 60 from an outside in the radial direction to have the thin bending portion 61 elastically deformed, whereby the location of the longitudinal groove 60 is bent in such a manner as to be pushed most forwardly against the fixing portion 32. Like this, the relief valve 33 is bent at plurality of locations, so that the valve opening operation can be carried out smoothly and the opening area can be increased.

While the invention has been described in its preferred embodiments, it is to be understood that the present invention is not limited thereto but may be otherwise variously modified and applied within the scope and sprit of the invention. For example, in the third embodiment, only the longitudinal groove 60 functioning as the opening and closing adjustment groove in the shape of a longitudinally extending groove may be provided without being combined with the circumferentially extending opening and closing adjustment groove 37. Also, the number, the location, etc. of the opening and closing adjustment groove in each of the embodiments may be freely determined. Further, the thin bending portion 38 may be formed by providing one or more cut-out concaves.

What is claimed is:

1. A liquid sealed vibration isolating device comprising:
a first mounting member being mounted on one mounting counterpart,
a second mounting member being mounted on an other mounting counterpart,
an insulator elastically connecting said first and second mounting members,
a primary liquid chamber using said insulator as a part of a primary liquid chamber wall and being filled with a hydraulic liquid,
a secondary liquid chamber being in communication through a partition member with said primary liquid chamber by an orifice passage and having at least a portion of a secondary liquid chamber wall thereof formed by a diaphragm,
said partition member comprising a circular elastic movable diaphragm and a frame member for supporting a fixing portion of an outer peripheral portion of said elastic movable diaphragm, said elastic movable diaphragm is housed in an inside space surrounded by an annular partition wall having an inner peripheral surface,
a leak passage which communicates between said primary liquid chamber and said secondary liquid chamber and is opened and closed by a relief valve, said leak passage being provided between said fixing portion and said inner peripheral surface of said annular partition wall, wherein said liquid sealed vibration isolating device defining an axis extending in a direction in which vibration input into the first mounting member is absorbed by deformation of the insulator, wherein said fixing portion is annular, surrounds said circular elastic movable diaphragm, and is centered on said axis, wherein a relief valve is provided integrally on an outer peripheral portion of said fixing portion, and outer side of said relief valve is shaped as an obliquely rising inclined wall that extends toward said primary liquid chamber as said relief valve extends away from said axis so as to bring an outside of said relief valve relatively closer to said primary liquid chamber and relatively farther away from said secondary liquid chamber as compared to a basal portion of said relief valve, said relief valve surrounding a concave portion that is opened toward said primary liquid chamber, whereby the basal portion of said relief valve is connected to said fixing portion includes a thin bending portion opened toward said primary liquid chamber, said thin bending portion having a first thickness and a remainder of said relief valve having a second thickness, said second thickness being greater than said first thickness, wherein the distal end of said relief valve includes an edge rib and a seat surface, said edge rib being shaped as a thick wall portion and defines an arc-shaped surface that is centered on the axis and, when said relief valve is in an at-rest sealing condition, faces in a direction parallel to said axis, said seat surface being centered on the axis and extending generally perpendicular to said edge rib, said relief valve is a one way valve that is closed when said seat surface of said relief valve adheres closely to said inner peripheral surface of said annular partition wall and is opened when said seat surface is separated from said annular partition wall, wherein a thin portion functioning as a starting point of bending in an opening and closing operation is structured as an opening and closing adjustment groove to extend in a circumferential direction.

2. The liquid sealed vibration isolating device according to claim 1, wherein said relief valve other than said thin bending portion is at least 1.5 times as thick as said thin bending portion.

3. The liquid sealed vibration isolating device according to claim 1, wherein an opening and closing adjustment groove is formed in the shape of a radially extending groove in the outer peripheral portion of said relief valve.

4. The liquid sealed vibration isolating device according to claim 1, wherein, in the case where a hydraulic pressure is applied to said primary liquid chamber generally parallel to the axis, the outer peripheral portion of said relief valve protrudes radially relative to the axis, and a stopper portion for supporting said protruding outer peripheral portion on a side of said secondary liquid chamber is provided in said partition member.

5. The liquid sealed vibration isolating device according to claim 2, wherein an opening and closing adjustment groove is provided in the basal portion of said relief valve to extend in a circumferential direction.

6. The liquid sealed vibration isolating device according to claim 2, wherein an opening and closing adjustment groove is formed in the shape of a radially extending groove in the outer peripheral portion of said relief valve.

7. The liquid sealed vibration isolating device according to claim 2, wherein, in the case where a hydraulic pressure is applied to said primary liquid chamber generally parallel to the axis, the outer peripheral portion of said relief valve protrudes radially relative to the axis, and a stopper portion for supporting said protruding outer peripheral portion on a side of said secondary liquid chamber is provided in said partition member.

8. The liquid sealed vibration isolating device according to claim 3, wherein, in the case where a hydraulic pressure is applied to said primary liquid chamber generally parallel to the axis, the outer peripheral portion of said relief valve protrudes radially relative to the axis, and a stopper portion for supporting said protruding outer peripheral portion on a side of said secondary liquid chamber is provided in said partition member.

9. The liquid sealed vibration isolating device according to claim 5, wherein, in the case where a hydraulic pressure is applied to said primary liquid chamber generally parallel to the axis, the outer peripheral portion of said relief valve protrudes radially relative to the axis, and a stopper portion for supporting said protruding outer peripheral portion on a side of said secondary liquid chamber is provided in said partition member.

10. The liquid sealed vibration isolating device according to claim 6, wherein, in the case where a hydraulic pressure is applied to said primary liquid chamber generally parallel to the axis, the outer peripheral portion of said relief valve protrudes radially relative to the axis, and a stopper portion for supporting said protruding outer peripheral portion on a side of said secondary liquid chamber is provided in said partition member.

* * * * *